United States Patent
Wang et al.

(10) Patent No.: US 10,705,367 B2
(45) Date of Patent: Jul. 7, 2020

(54) TOUCH DISPLAY PANEL HAVING TOUCH LINE FORMED ON THE SAME LAYER AS THE GATE LINE

(71) Applicants: BOE TECHNOLOGY GROUP CO., LTD., Beijing (CN); ORDOS YUANSHENG OPTOELECTRONICS CO., LTD., Ordos, Inner Mongolia (CN)

(72) Inventors: Zhengkui Wang, Beijing (CN); Jian Sun, Beijing (CN); Fei Huang, Beijing (CN); Jiguo Wang, Beijing (CN); Yun Qiao, Beijing (CN); Xiaozhou Zhan, Beijing (CN); Han Zhang, Beijing (CN); Zhen Wang, Beijing (CN); Wenwen Qin, Beijing (CN); Lele Cong, Beijing (CN); Peng Liu, Beijing (CN); Jianjun Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/180,419

(22) Filed: Nov. 5, 2018

(65) Prior Publication Data

US 2019/0235294 A1    Aug. 1, 2019

(30) Foreign Application Priority Data

Feb. 1, 2018  (CN) .......................... 2018 1 0103497

(51) Int. Cl.
*G02F 1/1333* (2006.01)
*G02F 1/1362* (2006.01)
*G06F 3/044* (2006.01)
*G06F 3/041* (2006.01)
*G02F 1/1368* (2006.01)

(52) U.S. Cl.
CPC ........ *G02F 1/13338* (2013.01); *G02F 1/1368* (2013.01); *G02F 1/133345* (2013.01); *G02F 1/136286* (2013.01); *G06F 3/044* (2013.01); *G06F 3/0412* (2013.01); *G06F 3/0443* (2019.05); *G06F 3/04164* (2019.05); *G02F 2201/121* (2013.01); *G06F 2203/04103* (2013.01)

(58) Field of Classification Search
CPC combination set(s) only.
See application file for complete search history.

(56) References Cited

U.S. PATENT DOCUMENTS

2007/0252614 A1* 11/2007 Jeon .................... G02F 1/13454
                                                       324/760.01

\* cited by examiner

*Primary Examiner* — Lauren Nguyen
(74) *Attorney, Agent, or Firm* — Ladas & Parry, LLP (57) ABSTRACT

An array substrate includes a base substrate, a plurality of first signal lines extending in a first direction, a plurality of second signal lines located on a different layer from the first signal lines and extending in a second direction intersecting the first direction, and a plurality of touch signal lines extending in the second direction disposed on the base substrate. Each touch signal line includes a first touch line segment and a second touch line segment, the first touch line segment disposed on the same layer as the first signal lines, and at least partially overlapping with at least one of the second signal lines in a direction perpendicular to a surface of the base substrate, the second touch line segment disposed on a different layer from the first signal lines, and the first touch line segment electrically connected with the second touch line segment through a first via.

14 Claims, 5 Drawing Sheets

FIG. 9

TOUCH DISPLAY PANEL HAVING TOUCH LINE FORMED ON THE SAME LAYER AS THE GATE LINE The present disclosure claims priority of Chinese Patent Application No. 201810103497.8 filed on Feb. 1, 2018, the disclosure of which is hereby entirely incorporated by reference as a part of the present disclosure.

TECHNICAL FIELD

Embodiments of the present disclosure relates to an array substrate and manufacturing method thereof, and a touch display panel.

BACKGROUND

With the development of technology, touch panels have become more and more widely used. The touch panel provides a simple and convenient manner of human-computer interaction by replacing a mechanical button panel with a tactile feedback system. According to different combinations of the touch panel and the display structure, the touch panel can be divided into types of Add-on, On-Cell and In-Cell. The In-Cell touch screen has a touch electrode of the touch panel embedded in the display structure, which can reduce the overall thickness of the module, and can reduce the manufacturing cost of the touch screen, and thus has a significant advantage in the market.

The In-Cell touch panel utilizes the principle of mutual-capacitance or self-capacitance to detect a touch position of a finger. For example, a plurality of self-capacitance electrodes disposed on the same layer and insulated from each other can be disposed in the touch panel. When the human body does not touch the screen, capacitance of the respective self-capacitance electrodes is a fixed value. When the human body touches the screen, capacitance of a corresponding self-capacitance electrode is a value resultant from adding the human body capacitance on the fixed value. The touch detection chip determines the touch position by detecting a change in the capacitance value of each self-capacitance electrode during the touch period. Compared with the mutual-capacitance touch screen, the self-capacitance touch screen can effectively improve the signal-to-noise ratio of the touch signal, thereby improving the accuracy of the touch detection.

SUMMARY

At least one embodiment of the present disclosure provides an array substrate, comprising: a base substrate; a plurality of first signal lines, disposed on the base substrate and extending in a first direction; a plurality of second signal lines, disposed on the base substrate and located on a different layer from the first signal lines, and extending in a second direction intersecting the first direction; and a plurality of touch signal lines, disposed on the base substrate and extending in the second direction; wherein each of the touch signal lines comprises a first touch line segment and a second touch line segment, the first touch line segment is disposed on the same layer as the first signal lines, and is at least partially overlapped with at least one of the second signal lines in a direction perpendicular to a surface of the base substrate, the second touch line segment is disposed on a different layer from the first signal lines, and the first touch line segment and the second touch line segment are electrically connected with each other through a first via.

In one embodiment of the present disclosure, the array substrate further comprises a plurality of dummy signal lines disposed on the base substrate and extending in the second direction; wherein each of the dummy signal lines comprises a first dummy line segment and a second dummy line segment, the first dummy line segment is disposed on the same layer as the first signal lines and is at least partially overlapped with at least one of the second signal lines, which is not overlapped with the touch signal lines, in the direction perpendicular to the surface of the base substrate, the second dummy line segment is disposed on a different layer from the first signal lines, and the first dummy line segment and the second dummy line segment are electrically connected with each other through a second via.

In the array substrate according to one embodiment of the present disclosure, the first signal line is a gate line configured to transmit a gate signal; and the second signal line is a display data line configured to transmit a display data signal.

In one embodiment of the present disclosure, the array substrate comprises a first insulating layer, wherein the first insulating layer covers the gate line, the first via penetrates the first insulating layer, and the second touch line segment is located on the same layer as the display data line and is disposed on the first insulating layer.

In one embodiment of the present disclosure, the array substrate comprises a second insulating layer, covering the display data line; and a common electrode, disposed on the second insulating layer.

In one embodiment of the present disclosure, the array substrate comprises a third via penetrating the second insulating layer, wherein the common electrode comprises a plurality of sub-electrodes acting as touch electrodes in a multiplexing manner, each of the plurality of sub-electrodes is electrically connected with a corresponding touch signal line via the third via.

In the array substrate according to one embodiment of the present disclosure, the touch signal lines do not overlap with a gap region of the plurality of sub-electrodes in the first direction.

In the array substrate according to one embodiment of the present disclosure, the third via and a gap region between the plurality of sub-electrodes do not overlap with each other.

In the array substrate according to one embodiment of the present disclosure, a plurality of adjacent touch signal lines are electrically connected with each other through a connection portion which is located on a same layer as the first touch line segment and extends in the first direction.

In one embodiment of the present disclosure, the array substrate comprises a plurality of sub-pixels defined by intersections of the first signal lines and the second signal lines, wherein each sub-pixel comprises a thin film transistor as a switching element, the first touch line segment or the second touch line segment does not overlap with the thin film transistor in the direction perpendicular to the surface of the base substrate.

In the array substrate according to one embodiment of the present disclosure, the touch signal line is a metal signal line.

At least one embodiment of the present disclosure provides a touch display panel, comprising any one of the array substrates as described above.

In the touch display panel according to one embodiment of the present disclosure, the touch display panel is a liquid crystal display panel.

At least one embodiment of the present disclosure provides a manufacturing method of an array substrate, comprising: forming, on a base substrate, a plurality of first signal lines extending in a first direction and first touch line segments of a plurality of touch signal lines extending in a second direction intersecting the first direction; forming, on the plurality of first signal lines and the first touch line segments, a plurality of second signal lines extending in the second direction and second touch line segments of a plurality of touch signal lines extending in the second direction; wherein the first touch line segments are located on a same layer as the first signal lines, and at least partially overlap with at least one of the second signal lines in a direction perpendicular to a surface of the base substrate, the second touch line segments are located at a different layer from the first signal lines, and the first touch line segments and the second touch line segments are electrically connected through the first via.

BRIEF DESCRIPTION OF THE DRAWINGS

In order to clearly illustrate the technical solutions of the embodiments of the disclosure, the drawings of the embodiments will be briefly described in the following; it is obvious that the drawings described below are only related to some embodiments of the disclosure and thus are not limitative of the disclosure.

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Unless otherwise defined, the technical terms or scientific terms used herein should have the common meaning as usually understood by those ordinary skilled in the art. The terms "first", "second" and similar words used in the present disclosure do not denote any order, quantity, or importance, but are only used to distinguish different components. Similarly, the words of "a", "an" or "the" are not intended to limit the number, but to indicate that there is at least one. Words like "including" or "comprising" and etc. mean that an element or an article before them contains an element or an article listed thereafter, while not excluding other elements or articles. Words such as "connect" or "couple" or the like are not to be limited to physical or mechanical connections, but can include electrical connections, either direct connections or indirect connections. Terms of "up", "down", "left", "right" and etc. are only used to indicate relative positional relationships. When an absolute position of the described object is changed, the relative positional relationship may be changed accordingly.

In a self-capacitance in-cell touch panel, in order to connect a touch electrode with a touch detection chip, a touch signal line correspondingly connected to the touch electrode is usually provided. The touch signal line can be separately fabricated by adding a mask process in addition to processes of preparing the array substrate for display, but this method leads to a complicated process and high production cost. The touch signal line can also be formed by the double-wiring method (that is, the display data line and the touch signal line are arranged in parallel on the same layer), however, this method reduces the aperture ratio of the pixel and degrades the display quality.

At least one embodiment of the present disclosure provides an array substrate and a manufacturing method thereof, and a touch display panel. By providing touch signal lines in segments, the touch signal lines can be fabricated by the existing process without adding mask processes, the production cost is low, and the aperture ratio will not be reduced, and thus the display quality will not be degraded.

Hereinafter, embodiments of the present disclosure will be described in detail with reference to the accompanying drawings. It should be noted that the same reference signs used in different figures refer to the same elements that have been described.

At least one embodiment of the present disclosure provides an array substrate comprising a base substrate, a plurality of first signal lines, a plurality of second signal lines, and a plurality of touch signal lines. The plurality of first signal lines are disposed on the base substrate and extend in a first direction. The plurality of second signal lines are disposed on the base substrate and are located on a layer different from the first signal lines, and extend in a second direction intersecting the first direction. The plurality of touch signal lines are disposed on the base substrate and are extend in the second direction. Each of the touch signal lines comprises a first touch line segment and a second touch line segment. The first touch line segment is disposed on the same layer as the first signal lines, and is at least partially overlapped with at least one of the second signal lines in a direction perpendicular to the surface of the base substrate. The second touch line segment is disposed on a layer different from the first signal lines. The first touch line segment and the second touch line segment are electrically connected through the first via.

Figure 1:
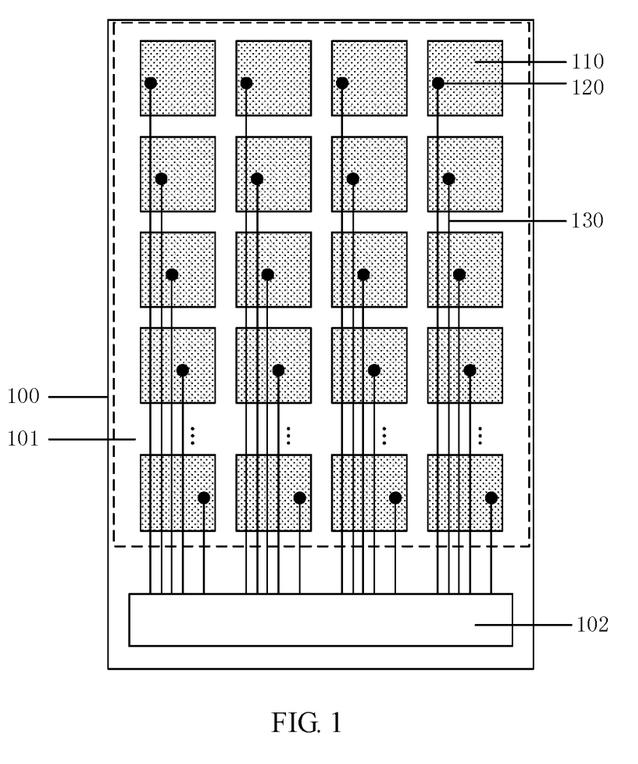
FIG. 1 is an illustrative plan view of an array substrate.

FIG. 1 is an illustrative plan view of an array substrate. Referring to FIG. 1, a plurality of touch electrodes 110 are disposed in an active touch area 101 of the base substrate 100, and the plurality of touch electrodes 110 are insulated from each other and arranged in a matrix. The active touch effective area 101 can completely overlap an active display area, or can be larger than or smaller than the active display area. Each of the touch electrodes 110 is electrically connected to a corresponding touch signal line 130 so as to transmit a touch signal. The touch electrodes 110 and the touch signal lines 130 are disposed on different layers, that is to say, the two layers are disposed on different layers. The touch electrodes 110 cover the touch signal lines 130 and are electrically connected thereto through touch connection vias 120, thereby reducing a distance between adjacent touch electrodes 110, avoiding touch dead zones, and reducing signal interference.

The touch electrode 110 can have a square shape, or can have any other shape such as a rectangle, a circle, a hexagon, or a triangle. The arrangement of the plurality of touch electrodes 110 is not limited and can be determined as required. The size of the touch electrode 110 is not limited. For example, in one example, the size of the touch electrode 110 is 5 mm*5 mm, so as to meet the requirement for the precision of the finger touch detection, and reduce the number of the touch electrodes 110 as much as possible at the same time.

The touch detection chip 102 is disposed on the base substrate 100 and is located outside the active touch area 101. The plurality of touch signal lines 130 are electrically connected to the touch detection chip 102 so as to achieve touch signal transmission between the touch electrodes 110 and the touch detection chip 102. Of course, the touch detection chip 102 can also be disposed outside the base substrate 100. For example, the touch detection chip 102 can be electrically connected with the touch signal line 130 through a flexible circuit board, for example, they are electrically connected to each other through a bonding region disposed on the base substrate 100.

During processing, the touch signal line 130 needs to be fabricated on the array substrate to ensure the touch function. For example, a corresponding process can be added to the existing process to fabricate the touch signal line 130, or the touch signal line 130 can be fabricated in the existing process.

Figure 2:
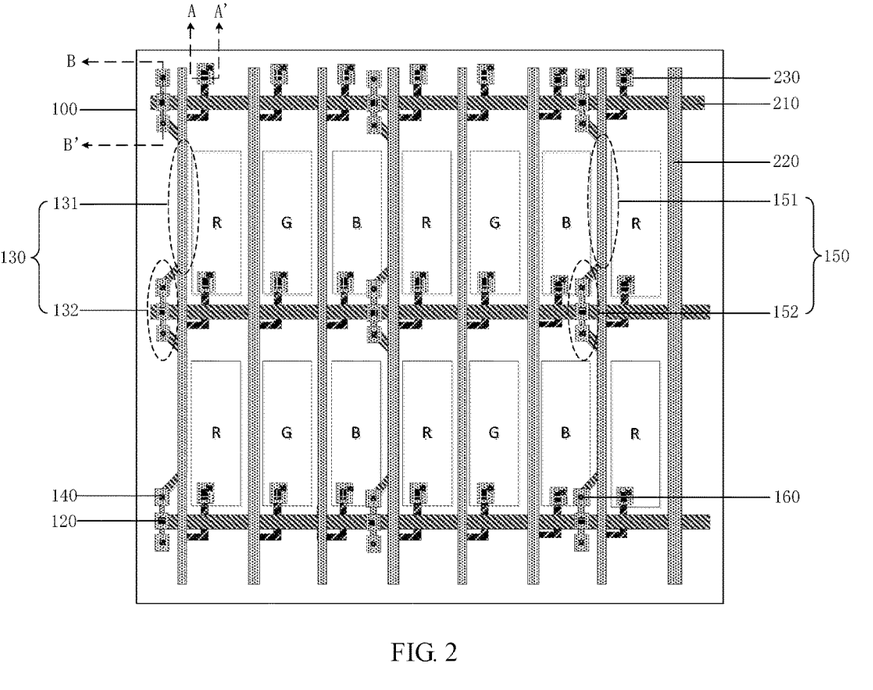
FIG. 2 is an illustrative plan view of an array substrate according to one embodiment of the present disclosure.

FIG. 2 is an illustrative plan view of an array substrate according to one embodiment of the present disclosure. The array substrate is, for example, an array substrate for a liquid crystal display panel, on which an array structure for driving liquid crystal material is formed. The array substrate can be opposed to an opposite substrate to form a liquid crystal cell, in which the liquid crystal material is filled, thereby obtaining a liquid crystal panel. The opposite substrate is, for example, a color filter substrate.

Referring to FIG. 2, a plurality of first signal lines 210 and a plurality of second signal lines 220 are disposed on the base substrate 100. The base substrate 100 serves as a carrier for supporting and protecting, and can be a glass substrate, a plastic substrate, or the like. The first signal lines 210 extend in a first direction (a horizontal direction in the figure). The second signal lines 220 extend in a second direction (a vertical direction in the figure). For example, the first direction and the second direction intersects with each other, for example, being perpendicular to each other. Of course, the embodiments of the present disclosure are not limited thereto, and the first direction and the second direction can be arbitrary directions, and the included angle between the first direction and the second direction can be an arbitrary angle.

The first signal line 210 and the second signal line 220 are located on different layers. For example, the first signal line 210 is disposed closer to the base substrate 100 in a direction perpendicular to the surface of the base substrate 100. Of course, the embodiments of the present disclosure are not limited thereto, and the positional relationship between the first signal line 210 and the second signal line 220 can be determined according to actual requirements. For example, the second signal line 220 can be disposed closer to the base substrate 100 in the direction perpendicular to the surface of the base substrate 100.

For example, the first signal line 210 can be a gate line configured to transmit a gate signal. The second signal line 220 can be a display data line configured to transmit a display data signal. It should be noted that, in various embodiments of the present disclosure, types of signals transmitted by the first signal line 210 and the second signal line 220 are not limited, and the first signal line 210 can be a display data line configured to transmit a display data signal, while the second signal line 220 can be a gate line configured to transmit a gate signal. For the sake of simplicity, an example in which the first signal line 210 is a gate line and the second signal line 220 is a display data line is taken in the following description.

The plurality of touch signal lines 130 are disposed on the base substrate 100 and extend in the second direction. Of course, the embodiments of the present disclosure are not limited thereto, and the touch signal lines 130 can extend in the first direction, which can be determined as required. The touch signal line 130 can be a metal signal line, made of such as aluminum or aluminum alloy, copper or copper alloy and etc., to reduce the resistance of the touch signal line 130 and improve the detection accuracy. Of course, the touch signal line 130 can be of a transparent conductive material, such as Indium Tin Oxide (ITO) or Indium Zinc Oxide (IZO), or other suitable materials, which is not restricted by the embodiments of the present disclosure. The touch signal line 130 comprises a first touch line segment 131 and a second touch line segment 132.

The first touch line segment 131 is located on the same layer as the first signal line 210, and thus the first touch line segment 131 can be simultaneously fabricated in the process of fabricating the first signal line 210, so that no additional process is required. The first touch line segment 131 is overlapped with at least one second signal line 220 in the direction perpendicular to the surface of the base substrate 100 so as to reduce the influence on the aperture ratio of the array substrate, improve the display quality of the display device using the array substrate and reduce power consumption during its operation. The first touch line segment 131 and the second signal line 220 can be completely overlapped or can be partially overlapped, which can be determined according to the respective widths and processes for the first touch line portion 131 and the second signal line 220. For example, in one example, the first touch line portion 131 is partially overlapped with at least one second signal line 220, which can reduce the requirement for process precision and facilitate processing. For example, in another example, the first touch line portion 131 is completely overlapped with at least one second signal line 220, so that the influence on the aperture ratio can be further reduced.

The second touch line segment 132 and the first signal line 210 are disposed on different layers. For example, in one example, the second touch line segment 132 can be disposed on the same layer as the second signal line 220, so that the second touch line segment 132 can be simultaneously fabricated in the process of fabricating the second signal line 220, and thus no additional process is required. The first touch line segment 131 and the second touch line segment 132 are electrically connected by a first via 140 formed in an insulating layer disposed therebetween.

It should be noted that, in various embodiments of the present disclosure, the touch signal line 130 can comprise a plurality of segments, and the number of the plurality of segments is not limited, and is not limited to the first touch line segment 131 and the second touch line segment 132. For example, it can comprise three segments or four segments and etc. The positional relationship among the various segments is not restricted and can be determined according to actual requirements.

For example, the array substrate can further comprise a touch electrode 110 (not shown in FIG. 2), and the touch signal line 130 is electrically connected with the touch electrode 110 through the touch connection via 120 (referring to FIG. 1) so as to transmit the touch signal. For example, the touch connection via 120 electrically connects the second touch line segment 132 to the touch electrode 110. Of course, the embodiments of the present disclosure are not limited thereto, and the touch connection via 120 can also electrically connect the first touch line segment 131 to the touch electrode 110, which can be determined according to the specific positions of the first touch line segment 131 and the second touch line segment 132. Each of the touch signal lines 130 can be electrically connected to a corresponding touch electrode 110 through one or more touch connection vias 120. For example, in one example, each of the touch signal lines 130 is electrically connected to a corresponding touch electrode 110 through a plurality of touch connection vias 120 so as to reduce contact resistance and improve signal quality.

The touch electrode 110 can be an electrode dedicatedly used for touch detection, or can be obtained by multiplexing a common electrode for display, which is not limited by the embodiments of the present disclosure. For example, in one example, the common electrode for display comprises a plurality of sub-electrodes arranged in parallel with each other, and the sub-electrodes act as the touch electrodes 110 in a multiplexing manner, and each of the sub-electrodes is electrically connected to a corresponding touch signal line 130 through the touch connection vias 120. In this way, the integration degree of the array substrate is enhanced, the thickness can be reduced, and no additional patterning process will be required, which is advantageous for reducing production cost and improving production efficiency. Each of the sub-electrodes can be electrically connected to one or more touch signal lines 130, which is not restricted by the embodiments of the present disclosure.

For example, since the touch precision (in millimeter order) is different from the display precision (in micron order) and the number of the touch signal lines 130 can be less than the number of the second signal lines 220, the array substrate can further comprise dummy signal lines 150 (Dummy) at positions where the touch signal lines 130 are not provided. The dummy signal lines 150 and the touch signal lines 130 can be identical or substantially identical in shape, size, and etc., thereby ensuring uniformity of process and manufacturability, and reducing noise interference. The plurality of dummy signal lines 150 are disposed on the base substrate 100 and extend in the second direction. The dummy signal line 150 may or may not be electrically connected to the touch electrode 110. Of course, the embodiments of the present disclosure are not limited thereto, and whether the dummy signal lines 150 are provided or not, as well as the number, material, extending direction, arranging manner, and connecting manner of the dummy signal lines 150 are not restricted, all these can be determined as required.

For example, the dummy signal line 150 comprises a first dummy line segment 151 and a second dummy line segment 152. Features such as the arrangements of the first dummy line segment 151 and the second dummy line segment 152 are similar to those of the first touch line segment 131 and the second touch line segment 132, and details of the description are omitted here. It should be noted that the first dummy line segment 151 is at least partially overlapped with at least one of the second signal lines 220 which is not overlapped with the touch signal line 130 in the direction perpendicular to the surface of the base substrate 100. The first dummy line segment 151 and the second dummy line segment 152 can be electrically connected with each other through a second via 160 formed in an insulating layer disposed therebetween.

For example, the array substrate further comprises a plurality of sub-pixels defined by intersections of the first signal lines 210 and the second signal lines 220, for example, a first sub-pixel R (i.e., a red sub-pixel) for displaying red light, a second sub-pixel G (i.e., a green sub-pixel) for displaying green light, and a third sub-pixel B (i.e., a blue sub-pixel) for displaying blue light. When the opposite substrate is a color filter substrate, the red sub-pixel, the green sub-pixel, and the blue sub-pixel on the color filter substrate correspond to the first sub-pixel R, the second sub-pixel G, and the third sub-pixel B, respectively. Each of the sub-pixels comprises a thin film transistor 230. The thin film transistor 230 which acts as a switching element can be a top gate type or a bottom gate type thin film transistor, and the plurality of thin film transistors 230 can comprise both top gate type thin film transistors and bottom gate type thin film transistors. The thin film transistor 230 can be an oxide thin film transistor, or can be a transistor of other types such as an amorphous silicon thin film transistor, a polysilicon thin film transistor, and etc. The first touch line segment 131 or the second touch line segment 132 does not overlap with the thin film transistor 230 in the direction perpendicular to the surface of the base substrate 100 so as to avoid signal interference and prevent short circuit. Likewise, the first dummy line segment 151 or the second dummy line segment 152 does not overlap with the thin film transistor 230 in the direction perpendicular to the surface of the base substrate 100.

It should be noted that, in various embodiments of the present disclosure, the array substrate can comprise more structures or less structures, and relative positional relationship of the respective structures is not restricted, and can be determined as required.

Figure 3:
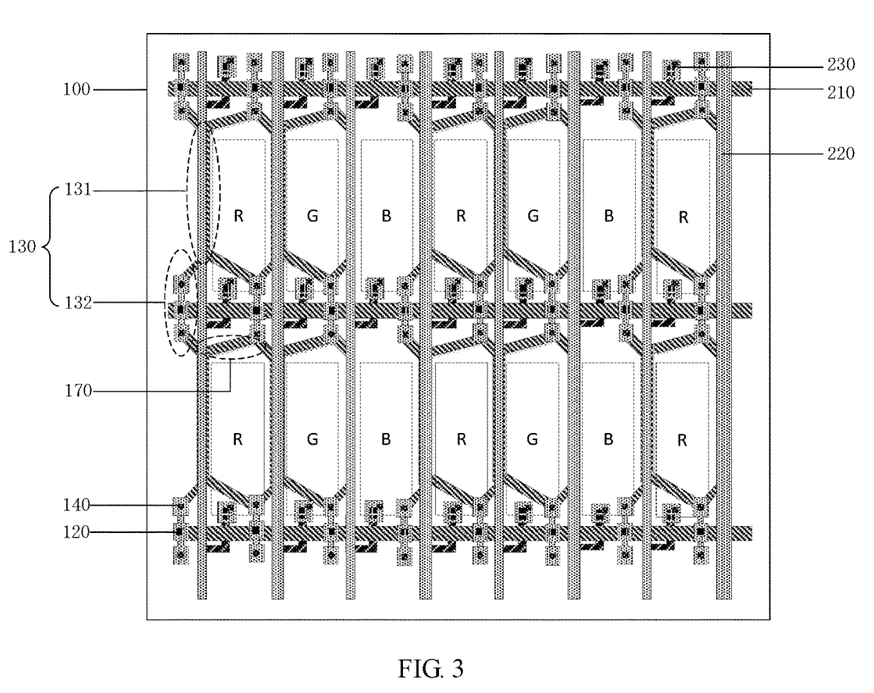
FIG. 3 is an illustrative plan view of an array substrate according to another embodiment of the present disclosure.

FIG. 3 is an illustrative plan view of an array substrate in accordance with another embodiment of the present disclosure. Referring to FIG. 3, the array substrate of this embodiment is substantially the same as the array substrate described in FIG. 2 except that it further comprises a connection portion 170. In this embodiment, the connection portion 170 is located on the same layer as the first touch line segment 131 and extends in the first direction. The connection portion 170 electrically connects the plurality of adjacent touch signal lines 130, so that the plurality of touch signal lines 130 are equivalent to a single touch signal line as a whole, so as to reduce the conduction resistance and improve the signal quality. For example, the connection portion 170 is electrically connected to the first touch line segment 131 of the plurality of touch signal lines 130. For example, the plurality of touch signal lines 130 connected by the connection portion 170 are covered by one touch electrode 110 (not shown in FIG. 3), and the touch signal lines 130 covered by different touch electrodes 110 are not connected by the connection portion 170, so that a touch function failure due to signal short-circuit is prevented.

It should be noted that, in various embodiments of the present disclosure, a position of the connection portion 170 is not restricted, and the connection portion 170 can be disposed on the same layer as the first touch line segment 131, or can be disposed on the same layer as the second touch line segment 132, or can be disposed on other layers and electrically connected to the first touch line segment 131 or the second touch line segment 132 through vias. The extending direction of the connecting portion 170 is not restricted and can be the first direction, the second direction, or any other direction. The number of the touch signal lines 130 connected through the connecting portion 170 is not limited, and can be two, three or any other number, which can be determined according to the specific arrangements of the touch signal line 130 and the touch electrode 110. The material of the connection portion 170 can be a metal or a transparent conductive material and etc., which is not limited by the embodiments of the present disclosure.

Figure 4:
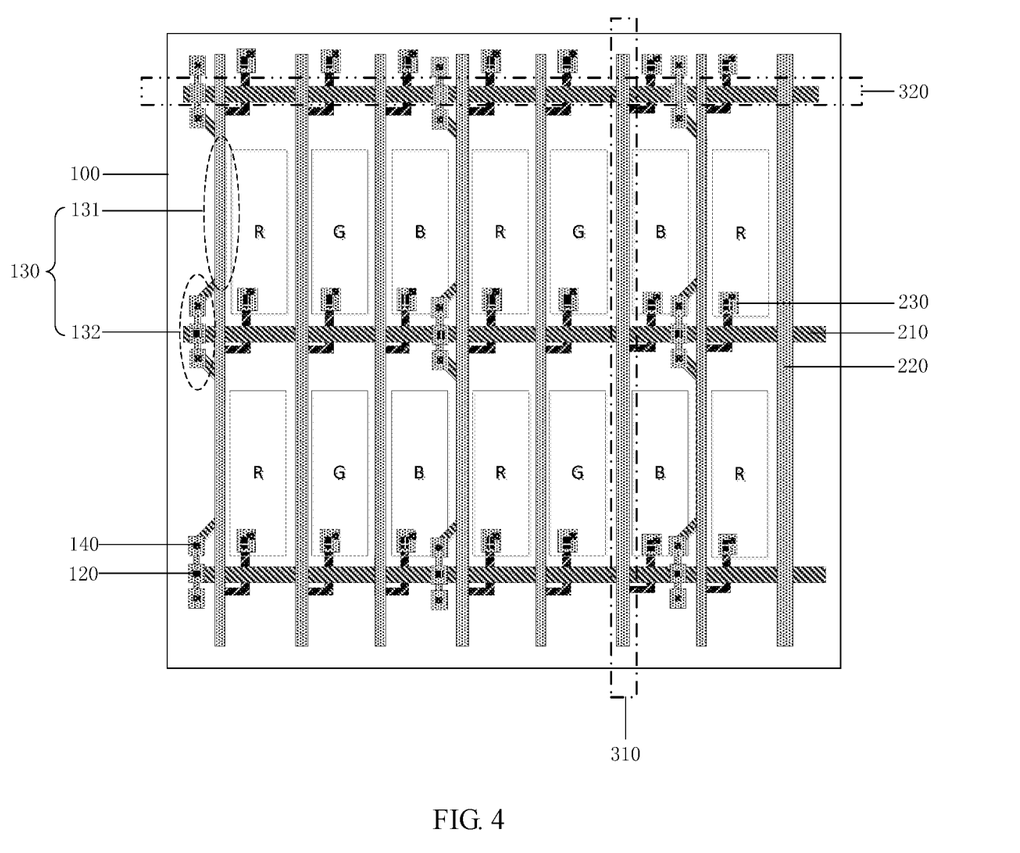
FIG. 4 is an illustrative plan view of a gap region of a touch electrode of the array substrate according to one embodiment of the present disclosure.

FIG. 4 is an illustrative plan view of a gap region of a touch electrode of an array substrate according to one embodiment of the present disclosure. Referring to FIG. 4, the first gap region 310 (the region surrounded by the dot dash line in FIG. 4) is a gap region between adjacent touch electrodes 110 (not shown in FIG. 4) arranged in the first direction, and the second gap region 320 (the region surrounded by the double dot dash line in FIG. 4) is a gap region between adjacent touch electrodes 110 arranged in the second direction. The touch signal line 130 does not overlap with the first gap region 310, that is to say, the touch signal line 130 is not disposed in the first gap region 310. In this way, it can be ensured that the touch signal lines 130 are all covered by the touch electrodes 110, thereby reducing signal interference and improving signal quality. The third via (i.e., the touch connection via 120) does not overlap with either of the first gap region 310 or the second gap region 320, that is to say, the third via is not disposed in the first gap region 310 and the second gap region 320, which simplifies the production process. It should be noted that, in various embodiments of the present disclosure, the size, number, and direction of the first gap region 310 and the second gap region 320 are not restricted, and can be determined according to the number and arrangement of the touch electrodes 110.

Figure 5:
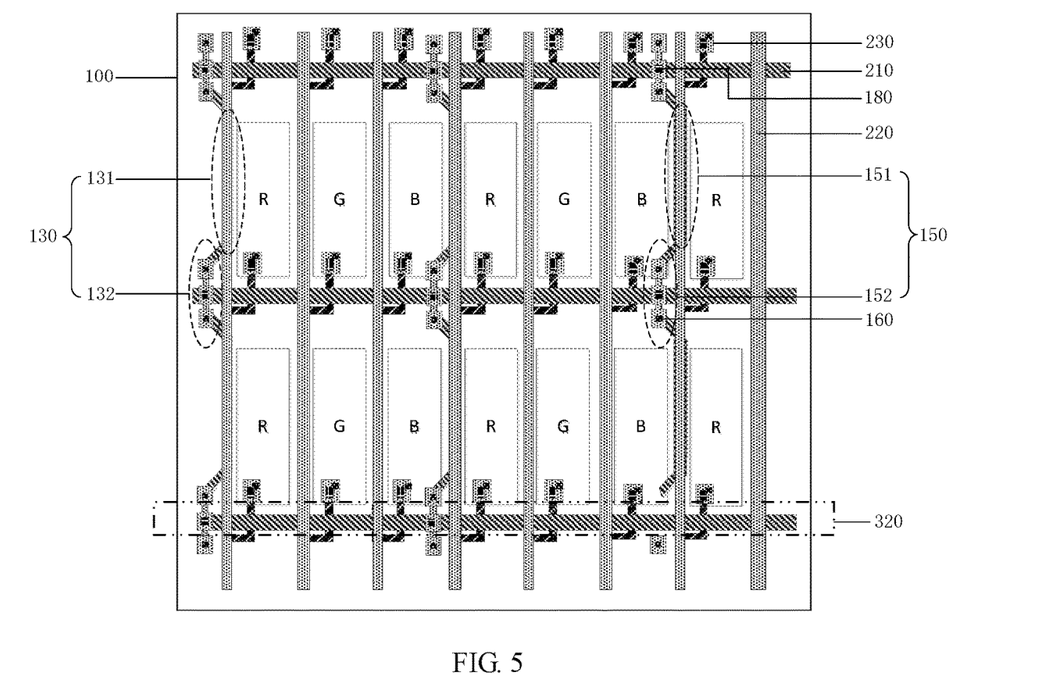
FIG. 5 is an illustrative plan view of a gap region of a touch electrode of the array substrate according to another embodiment of the present disclosure.

FIG. 5 is an illustrative plan view of a gap region of a touch electrode of an array substrate according to another embodiment of the present disclosure. Referring to FIG. 5, the array substrate comprises a dummy signal line 150. The dummy signal line 150 is electrically connected to the touch electrode 110 (not shown in FIG. 5) through the fourth via 180. The dummy signal line 150 is not disposed in the second gap region 320. For example, the first dummy line segment 151 and/or the second dummy line segment 152 are disconnected in the second gap region 320 so as to avoid short-circuit of the plurality of touch electrodes 110. Of course, the embodiments of the present disclosure are not limited thereto, and the manner in which the dummy signal line 150 is disposed in the second gap region 320 can be determined according to actual requirements. For example, in other examples, if the dummy signal line 150 is not electrically connected to the touch electrode 110, namely, if the fourth via 180 is omitted, the dummy signal line 150 can be disposed in the second gap region 320, so that short-circuit of the plurality of touch electrodes 110 can be avoided.

Figure 6:
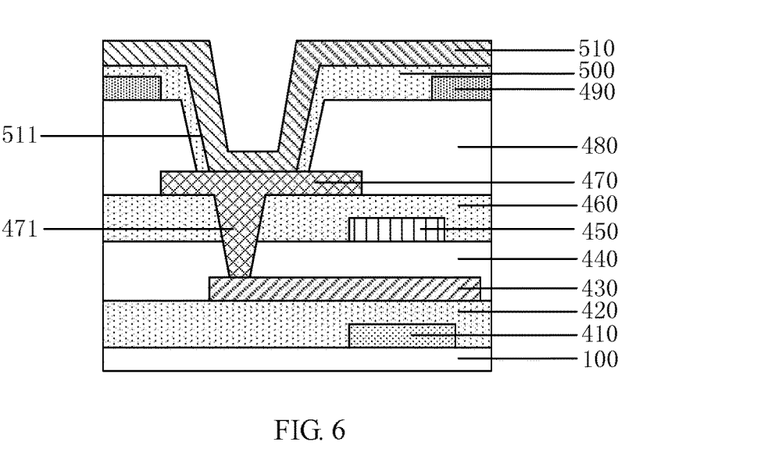
FIG. 6 is an illustrative cross-sectional view of the array substrate according to one embodiment of the present disclosure taken along an A-A' direction of FIG. 2.
Figure 7:
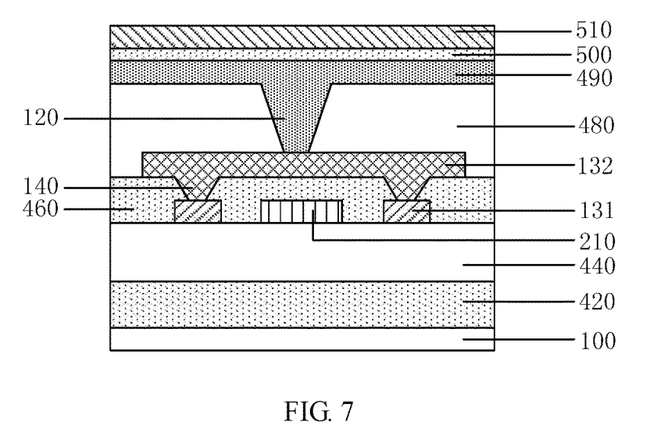
FIG. 7 is an illustrative cross-sectional view of the array substrate according to one embodiment of the present disclosure taken along an B-B' direction of FIG. 2.

FIG. 6 is an illustrative cross-sectional view of the array substrate according to an embodiment of the present disclosure taken along the A-A' direction of FIG. 2, and FIG. 7 is an illustrative cross-sectional view of the array substrate according to an embodiment of the present disclosure taken along the B-B' direction of FIG. 2. The manufacturing process of the array substrate will now be described with reference to FIG. 6 and FIG. 7. The array substrate can be prepared by a 9-Mask processes (9-mask processes and 2-deposition processes) based on Low Temperature Poly-silicon (LTPS), and the touch signal lines 130 can be prepared without any additional process, so that the production cost is low. Of course, the array substrate can also be prepared by other processes and in other sequences, which is not restricted by the embodiment of the present disclosure.

Taking the 9-Mask processes as an example, at first, patterning of a light shielding layer 410 is performed, and the light shielding layer 410 is formed on the base substrate 100 through a mask process. The light shielding layer 410 prevents an active layer (for example, polysilicon, amorphous silicon, or oxide semiconductor, and etc.) in the thin film transistor formed thereon from being irradiated by intensive light from, for example, the back side (the lower side in the figure) of the base substrate 100 and thus producing photo-generated carriers which deteriorates switching performance. The light shielding layer 410 can be prepared by materials such as metal or metal oxide.

A buffer layer 420 is disposed on the base substrate 100 and covers the light shielding layer 410 and the remaining area of a surface of the base substrate to prevent impurities (for example, metal ions) in the base substrate 100 from diffusing into the active layer, the gate insulating layer, or the like in the thin film transistor. The buffer layer 420 can be prepared by a deposition process. The buffer layer 420 can be made of an inorganic material or an organic material.

An active layer 430 is disposed on the buffer layer 420 to provide a channel region, and overlaps with the light shielding layer 410 in a direction perpendicular to the surface of the base substrate 100. The active layer 430 can be prepared by a mask process. The active layer 430 can be made of amorphous silicon, polycrystalline silicon, metal oxide, or other suitable materials. The array substrate further comprises a source/drain electrode. For example, the source/drain electrode can be disposed on the same layer as the active layer 430 and directly engages the two ends of the active layer 430. A gate insulating layer 440 is disposed on the active layer 430 to have a function of insulation, isolation or the like, and can be prepared by a deposition process. The gate insulating layer 440 can be made of silicon nitride, silicon oxide or other suitable materials.

A first signal line 210, a first touch line segment 131, and a gate electrode 450 are disposed on the gate insulating layer 440, and can be made of metal, a transparent conductive material, or any other suitable material. For example, the first signal line 210, the first touch line segment 131, and the gate electrode 450 can be prepared through the same mask process. A first insulating layer 460 is disposed on the gate insulating layer 440 and covers the first signal line 210, the first touch line segment 131, and the gate electrode 450. The first insulating layer 460 can be prepared by a mask process, and can be made of silicon nitride, silicon oxide, or any other suitable material.

A source/drain contact electrode 470 and the second touch line segment 132 are disposed on the first insulating layer 460, and the second signal line 220 (not shown in FIG. 6 and FIG. 7) is also disposed on the first insulating layer 460 and is located on the same layer as the second touch line segment 132 and the source/drain contact electrode 470. For example, the source/drain contact electrode 470, the second touch line segment 132, and the second signal line 220 can be prepared by the same mask process. The second touch line segment 132 is electrically connected to the first touch line segment 131 through the first via 140 disposed on the first insulating layer 460. The source/drain contact electrode 470 is electrically connected with the source/drain electrode located on the same layer as the active layer 430 through a fifth via 471 penetrating the first insulating layer 460 and the gate insulating layer 440. At least a portion of the second signal line 220 is electrically connected to the source/drain contact electrode 470, for example, to the source contact electrode or to the drain contact electrode. A second insulating layer 480 is disposed on the first insulating layer 460 and covers the source/drain contact electrode 470, the second touch line segment 132, and the second signal line 220. The second insulating layer 480 can be prepared by a mask process, and can be made of silicon nitride, silicon oxide, or any other suitable material.

A common electrode 490 is disposed on the second insulating layer 480 and can be prepared by a mask process. The common electrode 490 is electrically connected to the second touch line segment 132 through a touch connection via 120 disposed in the second insulating layer 480. The common electrode 490 not only operates when performing display but also acts as a touch electrode 110 in a manner of time division multiplexing for touch detection. The common electrode 490 can be made of a transparent conductive material or any other suitable material. A third insulating layer 500 is disposed on the common electrode 490 and can be prepared by a mask process. The third insulating layer 500 can be made of silicon nitride or any other suitable material.

A pixel electrode 510 is disposed on the third insulating layer 500 for providing an electric field for deflecting the liquid crystal molecules after being charged. The pixel electrode 510 is electrically connected to the source/drain contact electrode 470 through a sixth via 511 penetrating the third insulating layer 500 and the second insulating layer 480. For example, when the second signal line 220 is electrically connected to the source contact electrode, the pixel electrode 510 is electrically connected to the drain contact electrode. For example, when the second signal line 220 is electrically connected to the drain contact electrode, the pixel electrode 510 is electrically connected to the source contact electrode. When a gate signal is applied to the gate electrode 450, the active layer 430 is conducted, and a display data signal is transmitted from the second signal line 220 to the pixel electrode 510 through the active layer 430 to charge the pixel electrode 510. The pixel electrode 510 can be prepared by a mask process, and can be made of a transparent conductive material or any other suitable material.

At least one embodiment of the present disclosure further provides a touch display panel comprising the array substrate according to any of the embodiments of the present disclosure. When the touch display panel is prepared, the touch signal line can be fabricated by an existing process without any additional mask process. The production cost is low, the aperture ratio will not be reduced, and the display quality will not be affected.

Figure 8:
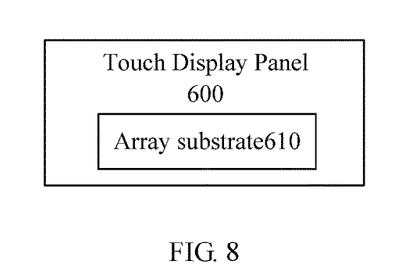
FIG. 8 is a block diagram of a touch display panel according to one embodiment of the present disclosure.

FIG. 8 is a block diagram of a touch display panel according to an embodiment of the present disclosure. Referring to FIG. 8, the touch display panel 600 comprises an array substrate 610. The array substrate 610 is the array substrate described in any of the embodiments of the present disclosure. It should be noted that, in various embodiments of the present disclosure, a type of the touch display panel 600 is not restricted. For example, the touch display panel 600 can be a liquid crystal display panel or an organic light emitting diode display panel or the like. For example, the liquid crystal display panel can be a Twisted Nematic (TN) type liquid crystal display panel, or can be an Advanced Super Dimension Switch (ADS) type liquid crystal display panel or an In-Plane Switch (IPS) type liquid crystal display panel. The touch display panel 600 can be applied to any product or component having a display function and a touch function, such as a monitor, a mobile phone, a tablet PC, a laptop, an electronic book, a game machine, a television, a digital photo frame, a navigator, and the like.

At least one embodiment of the present disclosure further provides a manufacturing method of an array substrate. The method comprises: forming a plurality of first signal lines extending in a first direction and first touch line segments of a plurality of touch signal lines extending in a second direction intersecting the first direction on a base substrate; forming, on the plurality of first signal lines and the first touch line segments, a plurality of second signal lines extending in the second direction and second touch line segments of a plurality of touch signal lines extending in the second direction. The first touch line segments are located on the same layer as the first signal lines, and at least partially overlap with at least one of the second signal lines in a direction perpendicular to a surface of the base substrate, the second touch line segments are located at a different layer from the first signal lines, and the first touch line segments and the second touch line segments are electrically connected through the first via. The method can be used to manufacture the array substrate of any of the above embodiments, and the touch signal lines can be prepared by an existing process without any additional mask process, and the production cost is low, the aperture ratio is not reduced, and the display quality is not affected.

Figure 9:
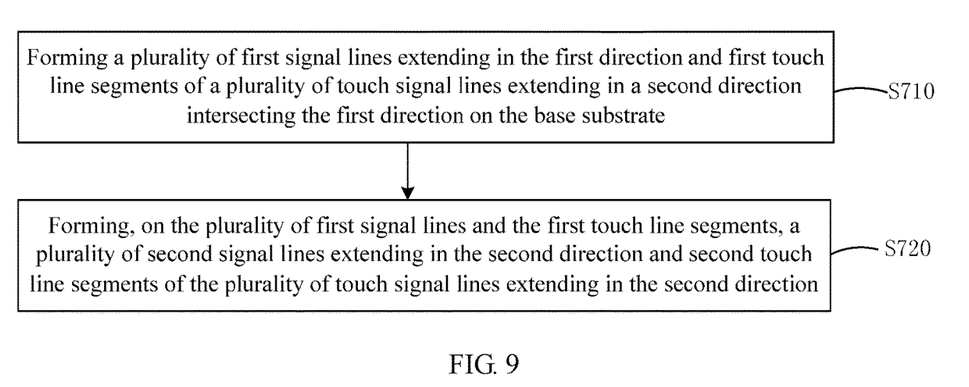
FIG. 9 is a flow chart of a manufacturing method of an array substrate according to one embodiment of the present disclosure.

FIG. 9 is a flow chart of a manufacturing method of an array substrate according to an embodiment of the present disclosure. Referring to FIG. 9, the method comprises the following steps:

Step S710: forming a plurality of first signal lines extending in the first direction and first touch line segments of a plurality of touch signal lines extending in a second direction intersecting the first direction on the base substrate;

Step S720: forming, on the plurality of first signal lines and the first touch line segments, a plurality of second signal lines extending in the second direction and second touch line segments of the plurality of touch signal lines extending in the second direction.

For example, the first signal line, the second signal line, the first touch line segment, and the second touch line segment can be prepared by a mask process. The first touch line segment is located on the same layer as the first signal line, and at least partially overlaps with at least one second signal line in a direction perpendicular to the surface of the base substrate. The second touch line segment is located on a different layer from the first signal line, and the first touch line segment and the second touch line segment are electrically connected with each other through the first via.

It should be noted that, in various embodiments of the present disclosure, the manufacturing method of the array substrate is not limited to the steps and the sequences described above, and can comprise more steps or less steps, and the sequence of the steps can be determined according to actual requirements.

The following shall be noted: (1) The drawings of the embodiments of the present disclosure relate only to the structures involved in the embodiments of the present disclosure, and other structures can be referred to common designs; and (2) In the case of no conflict, the embodiments and the features of the embodiments of the present disclosure can be combined with each other to obtain a new embodiment.

The foregoing are merely exemplary embodiments of the disclosure, but the scope of protection of the present disclosure is not limited thereto. The protection scope of the disclosure shall be defined by the attached claims.

The invention claimed is:

1. An array substrate, comprising:
   a base substrate;
   a plurality of first signal lines, disposed on the base substrate and extending in a first direction;
   a plurality of second signal lines, disposed on the base substrate and located on a different layer from the first signal lines, and extending in a second direction intersecting the first direction;
   a plurality of touch signal lines, disposed on the base substrate and extending in the second direction;
   a second insulating layer, covering the second signal line;
   a common electrode, disposed on the second insulating layer;
   a third via, penetrating the second insulating layer,
   wherein each of the touch signal lines comprises a first touch line segment and a second touch line segment, the first touch line segment is disposed on the same layer as the first signal lines, and is at least partially overlapped with at least one of the second signal lines in a direction perpendicular to a surface of the base substrate, the second touch line segment is disposed on a different layer from the first signal lines, and the first touch line segment and the second touch line segment are electrically connected with each other through a first via,
   the first signal line is a gate line configured to transmit a gate signal; and the second signal line is a display data line configured to transmit a display data signal, and
   the common electrode comprises a plurality of sub-electrodes acting as touch electrodes in a multiplexing manner, each of the plurality of sub-electrodes is electrically connected with a corresponding touch signal line via the third via.

2. The array substrate according to claim 1, further comprising a plurality of dummy signal lines disposed on the base substrate and extending in the second direction;
   wherein each of the dummy signal lines comprises a first dummy line segment and a second dummy line segment, the first dummy line segment is disposed on the same layer as the first signal lines and is at least partially overlapped with at least one of the second signal lines, which is not overlapped with the touch signal lines, in the direction perpendicular to the surface of the base substrate, the second dummy line segment is disposed on a different layer from the first signal lines, and the first dummy line segment and the second dummy line segment are electrically connected with each other through a second via.

3. The array substrate according to claim 1, further comprising a first insulating layer, wherein the first insulating layer covers the gate line, the first via penetrates the first insulating layer, and the second touch line segment is located on the same layer as the display data line and is disposed on the first insulating layer.

4. The array substrate according to claim 1, wherein the touch signal lines do not overlap with a gap region of the plurality of sub-electrodes in the first direction.

5. The array substrate according to claim 1, wherein the third via and a gap region between the plurality of sub-electrodes do not overlap with each other.

6. The array substrate according to claim 1, wherein a plurality of adjacent touch signal lines are electrically connected with each other through a connection portion which is located on a same layer as the first touch line segment and extends in the first direction.

7. The array substrate according to claim 1, further comprising a plurality of sub-pixels defined by intersections of the first signal lines and the second signal lines, wherein each sub-pixel comprises a thin film transistor as a switching element, the first touch line segment or the second touch line segment does not overlap with the thin film transistor in the direction perpendicular to the surface of the base substrate.

8. The array substrate according to claim 1, wherein the touch signal line is a metal signal line.

9. A touch display panel, comprising the array substrate according to claim 1.

10. The touch display panel according to claim 9, wherein the touch display panel is a liquid crystal display panel.

11. A manufacturing method of an array substrate, comprising:
    forming, on a base substrate, a plurality of first signal lines extending in a first direction and first touch line segments of a plurality of touch signal lines extending in a second direction intersecting the first direction;
    forming, on the plurality of first signal lines and the first touch line segments, a plurality of second signal lines extending in the second direction and second touch line segments of a plurality of touch signal lines extending in the second direction;
    forming a second insulating layer to cover the second signal line;
    forming a common electrode on the second insulating layer;
    forming a third via that penetrates the second insulating layer,
    wherein, the first touch line segments are located on a same layer as the first signal lines, and at least partially overlap with at least one of the second signal lines in a direction perpendicular to a surface of the base substrate, the second touch line segments are located at a different layer from the first signal lines, and the first touch line segments and the second touch line segments are electrically connected through the first via,
    the first signal line is a gate line configured to transmit a gate signal; and the second signal line is a display data line configured to transmit a display data signal, and
    the common electrode comprises a plurality of sub-electrodes acting as touch electrodes in a multiplexing manner, each of the plurality of sub-electrodes is electrically connected with a corresponding touch signal line via the third via.

12. The array substrate according to claim 2, further comprising a first insulating layer, wherein the first insulating layer covers the gate line, the first via penetrates the first insulating layer, and the second touch line segment is located on the same layer as the display data line and is disposed on the first insulating layer.

13. The array substrate according to claim 2, wherein the touch signal lines do not overlap with a gap region of the plurality of sub-electrodes in the first direction.

14. The array substrate according to claim 2, wherein the third via and a gap region between the plurality of sub-electrodes do not overlap with each other.

* * * * *

UNITED STATES PATENT AND TRADEMARK OFFICE
CERTIFICATE OF CORRECTION

PATENT NO. : 10,705,367 B2  
APPLICATION NO. : 16/180419  
DATED : July 7, 2020  
INVENTOR(S) : Zhengkui Wang et al.

Page 1 of 1

It is certified that error appears in the above-identified patent and that said Letters Patent is hereby corrected as shown below:

On the Title Page

Item (73) Assignee:  
BOE TECHNOLOGY GROUP CO., LTD., Beijing (CN)

Is changed to:  
BOE TECHNOLOGY GROUP CO., LTD., Beijing (CN);  
ORDOS YUANSHENG OPTOELECTRONICS CO., LTD., Inner Mongolia (CN)

Signed and Sealed this  
Twenty-seventh Day of July, 2021

Drew Hirshfeld  
*Performing the Functions and Duties of the*  
*Under Secretary of Commerce for Intellectual Property and*  
*Director of the United States Patent and Trademark Office*